United States Patent [19]

Iden

[11] Patent Number: 4,700,099
[45] Date of Patent: Oct. 13, 1987

[54] STORED ENERGY THERMIONICS MODULAR POWER SYSTEM

[75] Inventor: Steven M. Iden, Huber Heights, Ohio

[73] Assignee: The United States of America as represented by the Secretary of the Air Force, Washington, D.C.

[21] Appl. No.: 936,680

[22] Filed: Dec. 1, 1986

[51] Int. Cl.⁴ .............................................. H02N 7/00
[52] U.S. Cl. .................................... 310/306; 136/205
[58] Field of Search ............... 136/200, 205, 208, 223, 136/230, 292; 315/32, 33, 46, 55; 313/46; 310/306, 307

[56] References Cited

U.S. PATENT DOCUMENTS

| | | | |
|---|---|---|---|
| 3,088,988 | 5/1963 | Menke | 136/4 |
| 3,362,853 | 1/1968 | Valdsaar | 136/205 |
| 3,452,423 | 7/1969 | Webb | 29/472.9 |
| 3,496,026 | 2/1970 | Mayo | 136/202 |
| 3,863,081 | 1/1975 | Jules et al. | 310/306 |
| 3,931,532 | 1/1976 | Byrd | 310/4 |
| 3,989,546 | 11/1976 | Purdy et al. | 136/202 |
| 4,040,903 | 8/1977 | Monroe, Jr. | 310/306 |

Primary Examiner—Deborah L. Kyle
Assistant Examiner—Brian S. Steinberger
Attorney, Agent, or Firm—Bobby D. Scearce; Donald J. Singer

[57] ABSTRACT

An integrated high power modular thermionic power system is described which comprises a heat source including a generally cylindrically shaped chemical reaction chamber enclosing a first chemical reactant, such as lithium, for exothermal reaction with a second chemical reactant, such as sulfur hexafluoride, controllably supplied from a separate source thereof to the reaction chamber; a plurality of ring shaped thermionic modules disposed around the reaction chamber with the thermionic emitter elements thereof in thermal contact with the reaction chamber and collector elements concentrically disposed around the emitters; a cylindrical heat sink disposed around the thermionic modules in thermal contact with the collector elements for absorbing heat therefrom; a plurality of heat radiating fins on the outer surface of the heat sink; and one or more heat pipes having the respective evaporator ends in thermal contact with the heat sink and the condenser ends disposed remote of the heat sink for conducting heat therefrom.

7 Claims, 7 Drawing Figures

U.S. Patent     Oct. 13, 1987     4,700,099
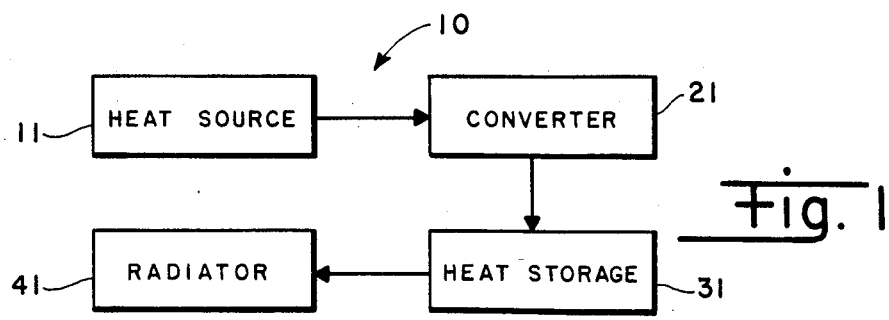
Fig. 1
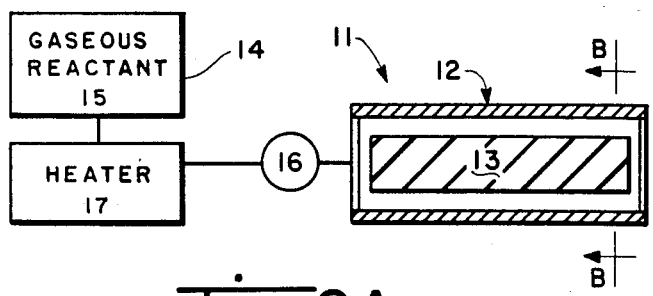
Fig. 2A
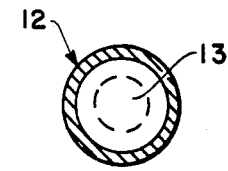
Fig. 2B
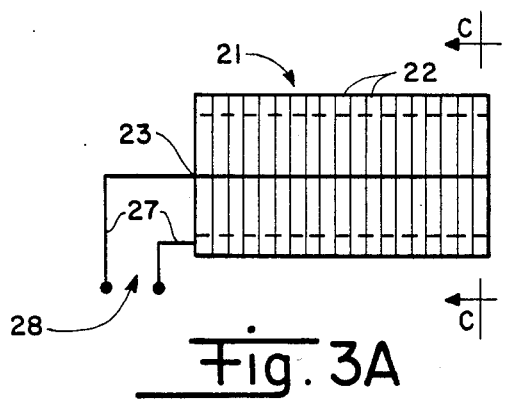
Fig. 3A
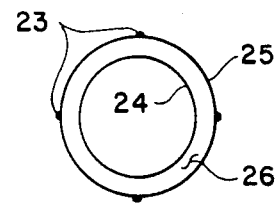
Fig. 3B
Fig. 4A
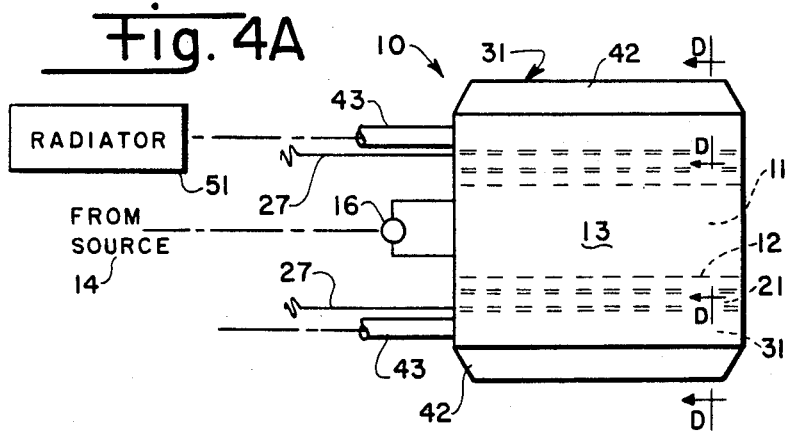
Fig. 4B
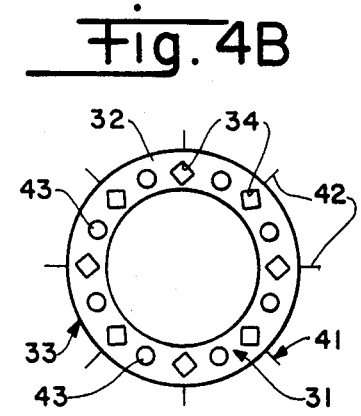

STORED ENERGY THERMIONICS MODULAR POWER SYSTEM

RIGHTS OF THE GOVERNMENT

The invention described herein may be manufactured and used by or for the Government of the United States for all governmental purposes without the payment of any royalty.

BACKGROUND OF THE INVENTION

The invention relates generally to thermionic power conversion systems, and more particularly to an integrated modular thermionic system for operation aboard orbiting spacecraft or in other remote environments in providing large amounts of power in short pulses.

In the operation of a thermionic converter, heat energy is converted directly to electrical current by heating a metallic emitter to sufficiently high temperatures that electrons escape the emitter and flow to a cooler collector. The source of heat energy for conversion to electrical current may be any of several types, an exothermic chemical reaction system being one such efficient type. In order to promote efficient operation of a thermionic system in the generation of useful amounts of electrical power, especially in such a system utilizing a chemical reaction, the system must not only generate large amounts of heat required for energizing the thermionic components, but must also provide for rejection of waste heat from the cold side of the thermionics.

The present invention provides an improved chemical reaction fueled thermionic power conversion system which is modular in structure for application aboard earth orbiting spacecraft or in other remote mission environments. The system is substantially closed and includes in compact modular form a centrally located heat source comprising a pair of chemical reactants which react exothermally, e.g., the lithium and sulphur hexafluoride system; an annular thermionic converter system is disposed concentrically around the heat source, the heat source/converter assembly being surrounded by an unconventional heat rejection system for removing heat from the cold side of the thermionics and thereby promoting efficient operation of the system. Preferred reactants occupy less total space after reaction than in an unreacted state so that the reaction proceeds within a closed system without generation of effluents or substantial overpressure. The system has essentially no moving parts which obviates friction and vibration problems. Each subsystem of the invention may have a modular configuration which facilitates refueling and replacement of components.

The power system of the invention has substantial utility as a power supply for directed or kinetic energy weapons, or other application requiring large amounts of power in short pulses.

It is therefore a principal object of the invention to provide an integrated high power modular thermionic power system.

It is a further object of the invention to provide a high power thermionic system for pulsed operation.

It is a further object of the invention to provide a closed thermionic power system having an easily replenishable heat source.

These and other objects of the invention will become apparent as the detailed description of representative embodiments proceeds.

SUMMARY OF THE INVENTION

In accordance with the foregoing principles and objects of the invention, an integrated high power modular thermionic power system is described which comprises a heat source including a generally cylindrically shaped chemical reaction chamber enclosing a first chemical reactant, such as lithium, for exothermal reaction with a second chemical reactant, such as sulfur hexafluoride, controllably supplied from a separate source thereof to the reaction chamber; a plurality of ring shaped thermionic modules disposed around the reaction chamber with the thermionic emitter elements thereof in thermal contact with the reaction chamber and collector elements concentrically disposed around the emitters; a cylindrical heat sink disposed around the thermionic modules in thermal contact with the collector elements for absorbing heat therefrom; a plurality of heat radiating fins on the outer surface of the heat sink; and one or more heat pipes having the respective evaporator ends in thermal contact with the heat sink and the condenser ends disposed remote of the heat sink for conducting heat therefrom.

DESCRIPTION OF THE DRAWINGS

The invention will be clearly understood from the following detailed description of representative embodiments thereof read in conjunction with the accompanying drawings wherein:

FIG. 1 is a block diagram of the principle subsystems of the invention;

FIG. 2A is a schematic axial sectional view of a reaction vessel and associated elements in a typical heat source of the invention;

FIG. 2B is a view along line B—B of FIG. 2A;

FIG. 3A is a schematic side view of the thermionic module assembly of the invention;

FIG. 3B is a view along line C—C of FIG. 3A;

FIG. 4A is a schematic side view of the integrated modular power system of the invention in assembled form including the thermal storage reservoir and radiator subsystems; and FIG. 4B is a view along lines D—D of FIG. 4A.

DETAILED DESCRIPTION

The thermionic power system of the invention comprises a high power, high energy density integrated modular system including a heat source, energy converter, thermal storage reservoir and radiator particularly applicable for high power pulsed operation. Referring first to FIG. 1, shown therein is a block diagram of the principle subsystems of the invention. Power system 10 of the invention comprises a heat source 11 in the form of a stored chemical energy reservoir for generating on demand large amounts of heat to power the thermionic converter subsystem. Thermionic converter system 21 is operatively connected to heat source 11 for converting heat from heat source 11 into electricity. Thermal energy storage reservoir 31 absorbs heat rejected from the cold side of thermionic power converter system 21. Radiator system 41 thermally contacts reservoir 31 and may include a finned heat radiator structure and heat pipes for the rejection of waste heat from constituent subsystems 11,21,31.

Referring now to FIGS. 2A,2B, shown in FIG. 2A is a schematic axial sectional view of a reaction vessel 12 comprising a typical heat source 11 of the invention FIG. 2B is a view along line B—B of FIG. 2A. In order to obtain a usable current density from thermionic converter 21, a large amount of heat must be generated on demand within heat source 11, the operation of converter 21 being temperature dependent and most efficient in the range of about 2000° to 3000° K. Numerous candidate heat source systems are appropriate for use in system 10, as would occur to one with skill in the applicable field. However, a chemical reaction system may be most desirable in providing a hermetically closed, substantially self-contained system 10. Accordingly, highly exothermic chemical reaction systems comprising a first (usually solid) reactant 13 encased within reaction vessel 12 and operatively connected to source 14 of second (usually gaseous) reactant 15 may be preferred. Controller 16 interconnects source 14 and vessel 12 for controllably supplying reactant 15 to vessel 12 for reaction with reactant 13 in generating heat for powering converter 21. Control of the chemical reaction is regulated by controlled influx of the gaseous reactant. Heater 17 may be included to preheat reactant 15 sufficiently (usually to about 100° C. for hereinafter named reactions) to promote reaction. Suitable chemical reaction systems include lithium (Li) (solid) and sulfur hexafluoride ($SF_6$) (gaseous). lithium and hydrogen ($H_2$), lithium and oxygen ($O_2$). lithium and fluorine (F), and beryllium (Be) and oxygen. The reaction products preferably occupy less volume than the individual reactants to avoid substantial pressurization of vessel 12, for self containment of system 10, particularly for use aboard an orbiting spacecraft or other remote application, and to avoid generation of effluents. Accordingly, $Li/SF_6$, $Li/H_2$ or Be/hd 2 systems may be preferred. Vessel 12 is of any selected material having sufficient strength for containing the reaction at the reaction temperature, and high temperature compatibility with the reactants and adjacent thermionic components (FIGS. 3A,3B); tantalum, tungsten and high temperature alloys thereof may be preferred materials.

Referring now to FIGS. 3A,3B shown therein are schematic side and end views of the thermionic module assembly comprising thermionic converter 21. Converter 21 is sized and shaped to enclose vessel 12 in the assembly of system 10 (see below ref. FIG. 4A) to provide optimum thermal contact between the outer surface of vessel 12 and the hot side of thermionic converter 21. Accordingly, converter 21 comprises a plurality of annular thermionic modules 22 connected in parallel as at 23. Modules 22 may be manufactured commercially to specification and comprises an inner emitter 24 comprising tungsten, tantalum, molybdenum, rhenium, graphite or other suitable metal or alloy, and collector 25 concentrically surrounding emitter 24 and spaced therefrom a distance of the order of about 0.1 to 1 mm. A vacuum may typically be maintained in annular space 26 defined between emitter 24 and collector 25. Collector 25 comprises niobium, molybdenum or other conventional material and is connected through parallel connections 23 and buses 27 to a load as suggested at 28.

Referring now to FIGS. 4A,4B shown in FIG. 4A is a schematic side view of the integrated modular power system of the invention in assembled form including thermal storage reservoir 31 and radiator system 41. FIG. 4B is a view along line D—D of FIG. 4A. Thermal storage reservoir 31 comprises a generally tubular structure for enclosing thermionic converter system 21 and for absorbing heat from the cold side (collector 25) of converter 21. In a preferred arrangement, thermal storage reservoir 31 and radiator 41 cooperate to perform the function of absorbing heat from converter 21 and radiating heat so absorbed externally of system 10. Accordingly, thermal storage reservoir 31 is structured to exhibit substantial heat storage capacity so that heat spikes from pulsed operation of system 10 may be stored during periods of peak power operation for radiation by radiator system 41 during off peak operation or shut down of system 10. In a preferred arrangement as suggested in FIGS. 4A,4B, sleeve 32 of highly heat absorbent material such as lithium salt (e.g., lithium hydride, lithium fluoride, lithium-magnesium fluoride) or other suitable material is enclosed in annular housing 33 of suitable heat conducting material. In order to accommodate thermal expansion of sleeve 32 material, a plurality of voids 34 defined in and running lengthwise of sleeve 32 and shown in FIG. 4B as having a square or diamond shaped cross section, are spaced substantially uniformly around the annulus defining sleeve 32. The per cent void of sleeve 32 material depends on material selection, about 25 vol % usually being adequate to prevent excessive strain on housing 33 by thermal expansion of sleeve 32.

Housing 33 for sleeve 32 may preferably comprise aluminum, titanium, stainless steel or other heat conducting metal or alloy having high temperature strength, for efficient heat conduction from thermal storage reservoir 31. A plurality of heat radiating fins 42 of like heat conducting material are disposed on the outer surface of housing 33 to further promote radiation of heat. In addition, one or more heat pipes 43 may be embedded lengthwise of sleeve 32 with the evaporator ends of heat pipes 43 in thermal contact with sleeve 32 to conduct heat from thermal storage reservoir 31 to an optional heat radiator 51 in the form of a two phase radiant heat exchange system or equivalent system operatively connected to the condenser ends of heat pipes 43.

FIG. 4A is a schematic of integrated modular power system 10 in assembled form. Outer housing 33 with fins 42 are shown with solid lines, and internally concentrically disposed thermal storage reservoir 31, converter 21, vessel 12 and solid reactant 13 are shown in phantom. Heat pipes 43, electrical connections 27 and gaseous reactant controller 16 are shown schematically. Overall size and electrical capacity of power source 10 is not considered limiting of the invention. However, in illustration of the size for power source 10 shown in FIG. 4A, consider a lithium and sulfur hexafluoride reaction system to produce 3 $MW_e$ in 200 sec pulses. Vessel 12 is about 2 feet diameter by 5 feet long, contains about 100 kg lithium and operates at about 2000° C. Converter assembly 21 operates at a collector temperature of about 2000° C. producing about 10 Kiloamps at 300 volts. Approximately 425 kg LiH combined with 6 inch by 5 foot aluminum fins 42 maintain the collector at the desired temperature. Overall, such a system 10 is about 3½ feet diameter by 5 feet long weighing about 2000 pounds including the $SF_6$ source 14. Heat pipes 43 of the wick type operate most efficiently in the structure described at operating temperatures. The system or any subsystem could be constructed in modular form for facility of installation, replacement or refueling.

The invention therefore provides an integrated modular thermionic power system particularly suitable for high power pulsed operation. It is understood that modifications to the invention as described may be made as might occur to one with skill in the field of the invention, within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. An integrated modular thermionic power conversion system, comprising:
   (a) a source of heat including a generally cylindrically shaped chemical reaction chamber, a first solid chemical reactant within said chamber, a separate source of second gaseous chemical reactant, and means interconnecting said separate source and said chamber for controllably supplying said second reactant to said chamber;
   (b) a plurality or ring shaped thermionic modules disposed around said reaction chamber, each module having an inner ring shaped thermionic emitter element in thermal contact with said reaction chamber and an outer ring shaped collector;
   (c) a cylindrically shaped heat sink disposed around said plurality of thermionic modules and in thermal contact with each said collector for absorbing heat from said each said collector; and
   (d) means for removing heat from said heat sink.

2. The system as recited in claim 1 wherein said means for removing heat from said heat sink comprises a plurality of heat radiating fins in thermal contact with said heat sink.

3. The system as recited in claim 2 further comprising at least one heat pipe having an evaporator end and a condenser end, said evaporator end being disposed in operative thermal contact with said heat sink and said condenser end being disposed remote of said heat sink for conducting heat away from said heat sink.

4. The system as recited in claim 1 wherein said first solid chemcal reactant and said second gaseous chemical reactant define a reactant pair selected from the group of pairs consisting of lithium and sulfur hexafluoride, lithium and hydrogen, lithium and fluorine, lithium and oxygen, and beryllium and oxygen.

5. The system as recited in claim 1 wherein said heat sink comprises a lithium salt.

6. The system as recited in claim 5 wherein said lithium salt is selected from the group consisting of lithium hydride, lithium fluoride, and lithium-magnesium fluoride 7. The system as recited in claim 1 wherein the emitter elements of said thermionic modules comprise a material selected from the group consisting of tungsten, tantalum, molybdenum, rhenium, and graphite.

* * * * *

UNITED STATES PATENT AND TRADEMARK OFFICE
CERTIFICATE OF CORRECTION

PATENT NO. : 4,700,099

DATED : October 13, 1987

INVENTOR(S) : Steven M. Iden

It is certified that error appears in the above-identified patent and that said Letters Patent is hereby corrected as shown below:

```
Column 3, line 21, no period (.) should appear after "C".
Column 3, line 24, the period (.) should be a comma (,).
Column 3, line 25, the period (.) should be a comma (,).
Column 3, line 32, "Be/hd 2" should be ---Be/O2---.
Column 6, line 12, in claim 4, "chemcal" should be
---chemical---.
Column 6, line 22, in claim 6, a period (.) should appear
after "ride" at the end of the claim.
```

Signed and Sealed this

Seventeenth Day of May, 1988

Attest:

DONALD J. QUIGG

Attesting Officer

Commissioner of Patents and Trademarks